(12) United States Patent
Gundert et al.

(10) Patent No.: US 9,051,400 B2
(45) Date of Patent: Jun. 9, 2015

(54) CATALYST COMPONENTS FOR THE POLYMERIZATION OF OLEFINS AND CATALYSTS THEREFROM OBTAINED

(75) Inventors: Friedhelm Gundert, Liederbach (DE); Martin Schneider, Hochheim (DE)

(73) Assignee: Basell Poliolefine Italia S.r.l., Milan (IT)

( * ) Notice: Subject to any disclaimer, the term of this patent is extended or adjusted under 35 U.S.C. 154(b) by 53 days.

(21) Appl. No.: 13/516,709

(22) PCT Filed: Dec. 17, 2010

(86) PCT No.: PCT/EP2010/070109
§ 371 (c)(1),
(2), (4) Date: Jun. 15, 2012

(87) PCT Pub. No.: WO2011/076692
PCT Pub. Date: Jun. 30, 2011

(65) Prior Publication Data
US 2012/0264895 A1    Oct. 18, 2012

Related U.S. Application Data

(60) Provisional application No. 61/335,593, filed on Jan. 8, 2010.

(30) Foreign Application Priority Data

Dec. 22, 2009    (EP) ..................................... 09180337

(51) Int. Cl.
C08F 4/646    (2006.01)
C08F 110/02    (2006.01)
C08F 10/00    (2006.01)

(52) U.S. Cl.
CPC ..................................... *C08F 10/00* (2013.01)

(58) Field of Classification Search
USPC ...................................................... 526/125.3
See application file for complete search history.

(56) References Cited

U.S. PATENT DOCUMENTS

| | | | |
|---|---|---|---|
| 4,180,636 A | 12/1979 | Hirota et al. | |
| 4,399,054 A | 8/1983 | Ferraris | |
| 4,469,648 A | 9/1984 | Ferraris | |
| 4,619,981 A | 10/1986 | Tajina et al. | |
| 4,829,034 A | 5/1989 | Iiskolan | |
| 5,100,849 A | 3/1992 | Miya | |
| 2004/0014594 A1 | 1/2004 | Chun et al. | |
| 2006/0217261 A1* | 9/2006 | Morini et al. | ................. 502/115 |
| 2009/0215611 A1 | 8/2009 | Yang et al. | |

FOREIGN PATENT DOCUMENTS

| | | |
|---|---|---|
| CN | 1771266 | 5/2006 |
| CN | 101519463 A | 9/2009 |
| EP | 553805 | 8/1993 |
| EP | 553806 | 8/1993 |
| EP | 0395083 | 11/1997 |
| WO | WO-9844009 | 10/1998 |
| WO | WO0198375 | 12/2001 |
| WO | WO-0198375 | 12/2001 |
| WO | WO-03055922 | 7/2003 |
| WO | WO-2008074674 | 6/2008 |
| WO | WO-2010076255 | 7/2010 |

* cited by examiner

*Primary Examiner* — Ling Choi
*Assistant Examiner* — Catherine S Branch

(57) ABSTRACT

A catalyst component for the polymerization of olefins comprising Mg, Ti and Cl obtained by a process comprising the following steps:
  a) reacting a precursor of formula $MgCl_2 \cdot mEtOH$, wherein m is equal to, or lower than, 1.5 having a porosity due to pores with radius up to 1μ of higher than 0.4 cm$^3$/g with an alcohol of formula $R^I OH$ where $R^I$ is an alkyl different from ethyl, a cycloalkyl or aryl radical having 3-20 carbon atoms said $R^I OH$ being reacted with the said precursor using molar ratio $R^I OH/Mg$ ranging from 0.01 to 10;
  b) reacting the product obtained in (a) with $TiCl_4$ using Ti/Mg molar ratio ranging from 0.01 to 15,
  c) reacting the product obtained in (b) with a silicon compound of formula $R^I_a R^{II}_b Si(OR^{III})_{4-(a+b)}$ where $R^I$-$R^{III}$ are linear or branched, cycloalkyl, aryl C1-C20 hydrocarbon groups a and b are integers from 0 to 2.

16 Claims, No Drawings

CATALYST COMPONENTS FOR THE POLYMERIZATION OF OLEFINS AND CATALYSTS THEREFROM OBTAINED

This application is the U.S. national phase of International Application PCT/EP2010/070109, filed Dec. 17, 2010, claiming priority to European Application 09180337.9 filed Dec. 22, 2009, and the benefit under 35 U.S.C. 119(e) of U.S. Provisional Application No. 61/335,593, filed Jan. 8, 2010; the disclosures of International Application PCT/EP2010/070109, European Application 09180337.9 and U.S. Provisional Application No. 61/335,593, each as filed, are incorporated herein by reference.

The present invention relates to catalyst components for the polymerization of olefins $CH_2=CHR$, wherein R is hydrogen or hydrocarbon radical having 1-12 carbon atoms. In particular, the invention relates to catalyst components suitable for the preparation of homopolymers and copolymers of ethylene and to the catalysts obtained therefrom.

In particular, the present invention relates to solid catalyst components, comprising titanium magnesium and halogen, and obtainable by a reaction with specific electron donors compounds. The catalysts of the invention are suitably used in (co)polymerization processes of ethylene to prepare (co)polymers having narrow Molecular Weight Distribution (MWD) and high activity. The MWD is an important characteristic of ethylene polymers in that it affects both the rheological behaviour, and therefore the processability, and the final mechanical properties. In particular, polymers with narrow MWD are suitable for cast films and injection moulding in that deformation and shrinkage problems in the manufactured article are minimized. The width of the molecular weight distribution for the ethylene polymers is generally expressed as melt flow ratio F/E, which is the ratio between the melt index measured by a load of 21.6 Kg (melt index F) and that measured with a load of 2.16 Kg (melt index E). The measurements of melt index are carried out according to ASTM D-1238 and at 190° C.

Catalyst components having the capability of giving polymers with narrow molecular weight distribution are also useful to prepare polymer compositions with broad molecular weight distribution. In fact, one of the most common methods for preparing broad MWD polymers is the multi-step process based on the production of different molecular weight polymer fractions in each step, sequentially forming macromolecules with different length on the catalyst particles. The control of the molecular weight obtained in each step can be carried out according to different methods, for example by varying the polymerization conditions or the catalyst system in each step, or by using a molecular weight regulator. Regulation with hydrogen is the preferred method either working in suspension or in gas phase. This latter kind of process is nowadays highly preferred due to both the high quality of the polymer obtained and the low operative costs involved with it.

It has been observed that final compositions of optimal properties are obtainable when a catalyst is used able to provide polymers with narrow MWD and different average Mw in each single step that, when combined together form final compositions with broad molecular weight distribution. In these multistep processes a critical step is that in which the lower average molecular weight polymer fraction is prepared. In fact, one of important features that the catalyst should possess is the so called "hydrogen response", that is the extent of capability to reduce the molecular weight of polymer produced in respect of increasing hydrogen concentration. Higher hydrogen response means that a lower amount of hydrogen is required to produce a polymer with a certain molecular weight. In turn, a catalyst with good hydrogen response would also usually display a higher activity in ethylene polymerization due to the fact that hydrogen has a depressive effect on the catalyst activity.

In addition, due to the polymerization conditions and characteristics of the polymer produced in this step (intrinsically higher fragility), the catalyst/polymer system is often fragmented in very small particles that reduce the polymer bulk density and create high amount of fines making difficult the operation of the plant particularly in the gas-phase polymerization.

In view of the above, it would be therefore useful to have a catalyst component able to provide ethylene polymers with narrow molecular weight distribution, combined with a good balance of polymerization activity and morphological stability.

Various attempts have been made to prepare catalysts able to withstand to such demanding polymerization conditions. In WO2008/074674 it has been described that a catalyst having good morphological stability and ability to withstand to drastic polymerization conditions could be obtained for example by subjecting an already preformed porous catalyst to thermal treatment and/or a contact stage with an aluminum alkyl compound. Although the results are good in terms of morphological stability, it has to be noted that this treatment, in addition to lowering the polymerization activity also makes the catalyst preparation process more complex.

A catalyst component for preparing ethylene (co)polymers having narrow MWD is described in the European patent application EP-A-553806. The catalyst, comprising Ti, Mg, halogen, $OR^I$ groups is characterized by a ratio OR/Ti of at least 0.5, by a porosity (determined with mercury porosimeter) of from 0.35 to 0.7 which furthermore has a specific pore distribution. Said catalyst is obtained by a rather long process which comprises the preparation of a $MgCl_2$-alcohol adduct having about 3 moles of alcohol which is first thermally dealcoholated up to an intermediate alcohol content and then chemically dealcoholated up to an almost complete extent. The so created porous precursor is then reacted with a titanium alkoxy compound in the presence of a halogenating agent and, optionally, of a reducing agent. The catalyst so obtained is able to produce ethylene (co)polymers with a narrow MWD but the morphological properties of the catalyst are not optimal. In EP 553805 catalyst component are disclosed as being prepared by a process which comprises the preparation of a $MgCl_2$-alcohol adduct having about 3 moles of alcohol which is thermally dealcoholated up to an intermediate alcohol content and then reacted with a titanium tetrachloride in molar ratio with the partially dealcoholated Mg containing precursor ranging from 0.3 to 3. The catalysts so prepared have high activity but the MWD is not sufficiently narrow.

EP08172960, still unpublished, discloses a catalyst obtained by a process comprising the following steps:
(a) reacting a precursor of formula $MgCl_2mEtOH$, wherein m is equal to, or lower than, 1.5 having a porosity due to pores with radius up to 1 μm of higher than 0.4 cm$^3$/g with an alcohol of formula $R^IOH$ where $R^I$ is an alkyl different from ethyl, a cycloalkyl or aryl radical having 3-20 carbon atoms said $R^IOH$ being reacted with the said precursor using molar ratio $R^IOH/Mg$ ranging from 0.01 to 10; and
(b) reacting the product obtained in (a) with $TiCl_4$ using Ti/Mg molar ratio ranging from 0.01 to 15.

The catalyst so obtained showed improved performances in terms of polymerization activity but the properties in terms of morphological stability still need to be improved particularly in respect of the polymerization carried out under high hydrogen content.

It has therefore surprisingly been found that a different preparation method is suited to prepare catalyst component endowed with the above mentioned characteristics. It is therefore an object of the present invention a catalyst component for the polymerization of olefins comprising Mg, Ti and Cl obtained by a process comprising the following steps:

(a) reacting a precursor of formula $MgCl_2 \cdot mEtOH$, wherein m is equal to, or lower than, 1.5 having a porosity due to pores with radius up to 1μ of higher than 0.4 cm$^3$/g with an alcohol of formula $R^4OH$ where $R^4$ is an alkyl different from ethyl, a cycloalkyl or aryl radical having 3-20 carbon atoms said $R^4OH$ being reacted with the said precursor using molar ratio $R^4OH/Mg$ ranging from 0.01 to 10; and (b) reacting the product obtained in (a) with $TiCl_4$ using Ti/Mg molar ratio ranging from 0.01 to 15 and (c) reacting the product obtained in (b) with a silicon compound of formula $R^I{}_a R^{II}{}_b Si(OR^{III})_{4-(a+b)}$ where $R^I$-$R^{III}$ are C1-C20 hydrocarbon groups a and b are integers from 0 to 2.

Preferably, in step (a) the molar ratio $R^4OH/Mg$ ranges from 0.05 to 4, and more preferably from 0.1 to 2 and especially ranging from 0.1-1.5. Preferably the reaction is carried out in a hydrocarbon liquid medium suitably selected from liquid saturated hydrocarbons. Preferably $R^4$ is selected from C3-C12 secondary alkyls and more particularly among C3-C8 cycloalkyls, cyclohexyl being the most preferred. The formula $R^4OH$ also includes polyhydroxy compounds such as glycols and other bi and multifunctional alcohols like butandiol, pentandiol and the like. The precursor of formula $MgCl_2 \cdot mEtOH$ has preferably porosity due to pores with radius up to 1μ of higher than 0.5 cm$^3$/g and more preferably ranging from 0.6 to 1.4 cm$^3$/g. Moreover, in the said precursor, m is preferably lower than 1, more preferably lower than 0.5 and especially ranging from 0.01 to 0.3.

The $MgCl_2 \cdot mEtOH$ precursor can be obtained by subjecting $MgCl_2 \cdot mEtOH$ in which m ranges from higher than 1.5 to 4.5 to a thermal and/or chemical dealcoholation process. The thermal dealcoholation process is carried out in nitrogen flow at temperatures comprised between 50 and 150° C. until the alcohol content is reduced to the desired value. The chemical dealcoholation is carried out with reagents capable of reacting with the OH groups of the alcohol and being thereafter washed away from the solid reaction product. Usually, after the chemical dealcoholation final amount of EtOH is reduced to values which are generally lower than 0.5 mols. The adducts can also be dealcoholated to a very great extent, by reducing the alcohol content down to values lower than 0.05 mols. The chemical treatment can be carried out after the thermal treatment or instead of it. The treatment with the dealcoholating chemical agents is carried out by using an amount of such an agent which is large enough to react with the OH groups present in the alcohol contained in the adduct. Preferably, the treatment is carried out using a slight excess of said agent, which is then removed prior to the reaction identified as step a). It is preferred to carry out the chemical dealcoholation of the $MgCl_2 \cdot EtOH$ adduct using Al-alkyl compound such as Al-triethyl, Aluminum triisobutyl, aluminium triisoprenyl or halogenated aluminium alkyl compound such as ethylaluminum dichloride or diethylaluminum chloride.

The $MgCl_2 \cdot mEtOH$ compounds in which m ranges from higher than 1.5 to 4.5 can generally be obtained by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Representative methods for the preparation of these spherical adducts are reported for example in U.S. Pat. No. 4,469,648, U.S. Pat. No. 4,399,054, and WO98/44009. Another useable method for the spherulization is the spray cooling described for example in U.S. Pat. Nos. 5,100,849 and 4,829,034. Adducts having the desired final alcohol content can be obtained by directly using the selected amount of alcohol directly during the adduct preparation. However, if adducts with increased porosity are to be obtained it is convenient to first prepare adducts with more than 1.7 moles of alcohol per mole of $MgCl_2$ and then removing totally or partially the alcohol via thermal or chemical dealcoholation. A process of this type is described in EP 395083.

In step (b), which is also preferably carried out in a liquid hydrocarbon medium, the $TiCl_4$ is preferably used in amounts such as to have a Ti/Mg molar ratio ranging from 0.1 to 10 and more preferably from 0.15 to 5 and especially ranging from 0.2 to 4 The reaction is carried out at a temperature ranging from 50 to 140° C., preferably from 60 to 120° C. and more preferably from 65 to 110° C. for a period of time ranging from 10 minutes to 10 hours, preferably from 30 minutes to 5 hours.

The catalyst component recovered from step (b) can be used in the next step as such, once washed and dried, or it can be subject to a pre-activation treatment with hydrocarbylaluminum having from 1 to 6 carbon atoms in the hydrocarbyl radical, e.g. triethylaluminum, triisobutylaluminum, triisohexylaluminum, aluminium triisoprenyl. Preference is given to triethylaluminum, triisobutylaluminum and triisoprenylaluminum. Also alkylaluminum halides and in particular alkylaluminum chlorides such as diethylaluminum chloride (DEAC), diisobutylalumunum chloride, Al-sesquichloride and dimethylaluminum chloride (DMAC) can be used. The mixing of the two reactants can be carried out in a stirred vessel at a temperature of from −30° C. to 150° C. According to the present invention, the pre-activation step is preferably carried out before step (c).

The solid catalyst obtained after step (b) or after the pre-activation treatment is then reacted with the silicon compound disclosed above. Preferably $R^{III}$ is a linear C1-C5 alkyl, preferably methyl or ethyl. A particularly preferred class is that in which a+b is 1 or 2 and $R^{III}$ is ethyl. In this connection, when b is 0 and a is 1, $R^I$ is preferably a linear or branched alkyl radical having from 3 to 10 carbon atoms. In this embodiment, $R^I$ is preferably selected from propyl, cyclopentyl, isopropyl and isobutyl.

According to another embodiment, a and b are 1, $R^I$ and $R^{II}$ are selected from C1-C10 alkyl, cycloalkyl or aryl groups and $R^{III}$ is a linear C1-C5 alkyl, preferably methyl or ethyl.

Non limiting exemplary silicon compounds include diethyldimethoxysilane, dipropyldimethoxysilane, diisopropyldimethoxysilane, dibutyldimethoxysilane, diisobutyldimethoxysilane, isobutylmethyldimethoxysilane, isopropylisobutyldimethoxysilane, dicyclopentyldimethoxysilane, cyclohexylmethyldimethoxysilane, diphenyldimethoxysilane, propyltrimethoxysilane, isopropyltrimethoxysilane, butyltrimethoxysilane isobutyltrimethoxysilane, cyclopentyltrimethoxysilane, phenyltrimethoxysilane, diethyldiethoxysilane, dipropyldiethoxysilane, diisopropyldiethoxysilane, dibutyldiethoxysilane, diisobutyldiethoxysilane, isobutylmethyldiethoxysilane, isopropylisobutyldimethoxysilane, dicyclopentyldiethoxysilane, cyclohexylmethyldiethoxysilane, diphenyldiethoxysilane, propyltriethoxysilane, isopropyltriethoxysilane, butyltriethoxysilane isobutyltriethoxysilane, cyclopentyltriethoxysilane, phenyltriethoxysilane.

The aforementioned silicon compound can be added in a molar ratio of 0.05 to 3, preferably from 0.1 to 1.5, more preferably from 0.2 to 1 with respect to transition metal fixed on the solid component after the reaction with magnesium alkoxide. The reaction is carried out in suspension under stirring at a temperature ranging from 0 to 150° C., preferably from 60 to 120° C. within 0.5 to 5 hours, preferably from 1 to 2 hours. After that the solid component can be washed and dried according to the usual techniques.

The catalyst components of the invention whatever is the method for their preparation, form catalysts, for the polymerization of olefins $CH_2=CHR^{III}$ wherein $R^{III}$ is hydrogen or a hydrocarbon radical having 1-12 carbon atoms by reaction with organo-Al compounds. In particular Al-trialkyl compounds, for example Al-trimethyl, Al-triethyl, Al-tri-n-butyl, Al-triisobutyl are preferred. The Al/Ti ratio is higher than 1 and is generally comprised between 5 and 800.

Also alkylaluminum halides and in particular alkylaluminum chlorides such as diethylaluminum chloride (DEAC), diisobutylalumunum chloride, Al-sesquichloride and dimethylaluminum chloride (DMAC) can be used. It is also possible to use, and in certain cases preferred, mixtures of trialkylaluminum's with alkylaluminum halides. Among them mixtures TEAL/DEAC and TIBA/DEAC are particularly preferred.

The above solid catalyst component and aluminum alkyls can be fed separately into the reactor where, under the polymerization conditions can exploit their activity. As mentioned above, it constitutes however a particular advantageous embodiment they can be pre-contacted components, optionally in the presence of small amounts of olefins, for a period of time ranging from 0.1 to 120 minutes preferably in the range from 1 to 60 minutes.

In addition it could be also possible to introduce the Al-alkyl compound(s) into the polymerization reactors in two or more aliquots. As an example, a first aliquot can be used to form the catalysts system in the pre-contact section together with the solid catalyst component and then introduced into the reactor for the polymerization step I and a second aliquot can be added to the system in the further step II.

The components of the invention and catalysts obtained therefrom find applications in the processes for the preparation of several types of olefin polymers.

As mentioned above, the catalysts of the invention are endowed with a particularly high morphological stability, high activity and capability to give ethylene polymers with narrow molecular weight distribution. Due to this features, they are particularly suitable for use in cascade, or sequential polymerization processes, for the preparation of broad molecular weight ethylene polymers both in slurry and gas-phase. In general the catalyst can be used to prepare: high density ethylene polymers (HDPE, having a density higher than 0.940 g/cm$^3$), comprising ethylene homopolymers and copolymers of ethylene with alpha-olefins having 3-12 carbon atoms; linear low density polyethylene's (LLDPE, having a density lower than 0.940 g/cm$^3$) and very low density and ultra low density (VLDPE and ULDPE, having a density lower than 0.920 g/cm$^3$, to 0.880 g/cm$^3$ cc) consisting of copolymers of ethylene with one or more alpha-olefins having from 3 to 12 carbon atoms, having a mole content of units derived from the ethylene higher than 80%. One additional advantage of the catalyst described in the present application is that it can be used as such in the polymerization process by introducing it directly into the reactor without the need of pre-polymerizing it. This allows simplification of the plant set-up and simpler catalyst preparation process.

The following examples are given in order to further describe and not to limit the present invention.

The properties are determined according to the following methods:

Porosity and surface area with nitrogen: are determined according to the B.E.T. method (apparatus used SORP-TOMATIC 1900 by Carlo Erba).

Porosity and surface area with mercury:

The measure is carried out using a "Porosimeter 2000 series" by Carlo Erba.

The porosity is determined by absorption of mercury under pressure. For this determination use is made of a calibrated dilatometer (diameter 3 mm) CD$_3$ (Carlo Erba) connected to a reservoir of mercury and to a high-vacuum pump (1·10$^{-2}$ mbar). A weighed amount of sample is placed in the dilatometer. The apparatus is then placed under high vacuum (less than 0.1 mm Hg) and is maintained in these conditions for 20 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and then the mercury pressure is gradually increased with nitrogen up to 140 kg/cm$^2$. Under the effect of the pressure, the mercury enters the pores and the level goes down according to the porosity of the material.

The porosity (cm$^3$/g), both total and that due to pores up to 1 μm, the pore distribution curve, and the average pore size are directly calculated from the integral pore distribution curve which is function of the volume reduction of the mercury and applied pressure values (all these data are provided and elaborated by the porosimeter associated computer which is equipped with a "MILESTONE 200/2.04" program by C. Erba.

Ti: photometrically via the peroxide complex

Mg, Cl: titrimetrically by customary methods

The product properties of the polymer powders reported in the tables were determined by the following methods:

MFR$_{216/190}$: mass flow rate (melt index) in accordance with EN ISO1133, nominal load=2.16 kg and test temperature=190° C.

Bulk density: in accordance with DIN EN ISO 60 d$_{50}$ (mean particle diameter): in accordance with DIN 53477 and DIN66144 portion of polymer particles in weight percent (wt. %) smaller than 300 nm determined in accordance with DIN 53477 s-value (=ln(d$_{50}$/d$_{16}$): in accordance with DIN 53477 and DIN66144

EXAMPLES

Example 1

A magnesium chloride and alcohol adduct containing about 3 mols of alcohol was prepared following the method described in example 2 of U.S. Pat. No. 4,399,054, but working at 3500 RPM instead of 10000 RPM.

The so obtained adduct was dealcoholated via a thermal treatment, under nitrogen stream, over a temperature range of 50-150° C. obtaining a precursor having the following composition: 18.9 wt. % Mg, 24.2 wt. % EtOH and 3.2 wt. % H$_2$O. Mean particle average is 46 μm.

a) Chemical Dealcoholisation of MgCl$_2$-EtOH Support with Triethylaluminium

In a 2 dm$^3$ four-neck flask provided with reflux condenser, stirrer and inert gas blanketing (Ar), 97.6 g of the above precursor corresponding to 0.74 mol of Mg were suspended in 1.0 dm³ of diesel oil having a boiling range from 140 to 170° C. (hydrogenated petroleum fraction). After cooling down to –10° C. 0.34 mol of triethylaluminium (TEA) diluted up to 0.5 dm³ with diesel oil was added dropwise while stirring over a period of 1 hour. Within 1 hour, the suspension was then heated to 50° C. After a post-reaction time of 0.5 hours it was subsequently cooled down again to ambient temperature. After the solid had settled, the supernatant liquid phase (mother liquor) was taken off. The solid was subsequently re-suspended in fresh diesel oil (hydrogenated petroleum fraction having a boiling range from 140 to 170° C.) and after a stirring time of 15 minutes and subsequent complete settling of the solid, the supernatant liquid phase was taken off again. This washing procedure was repeated three times. Then the suspension was cooled down again to –10° C. and addition of TEA and subsequent after-reaction and washing procedure was repeated twice. Afterwards the suspension was washed another two times as described above.

b) Preparation of Catalyst Component

The suspension described in a) was heated to 85° C. Then 0.16 mol of cyclohexanol diluted up to 0.05 dm³ with diesel oil was added dropwise over a period of 1 hour. After an after-reaction time of 1 hour, 0.81 mol TiCl₄ diluted up to 0.1 dm³ with diesel oil was added dropwise over a period of 0.5 hour. After an after-reaction time of 2 hours the suspension was cooled down to 60° C. Then the stirrer was switched off and after the solid had settled, the supernatant liquid phase (mother liquor) was taken off. The solid was subsequently re-suspended in fresh diesel oil (hydrogenated petroleum fraction having a boiling range from 140 to 170° C.) and after a stirring time of 15 minutes and subsequent complete settling of the solid, the supernatant liquid phase was taken off again. This washing procedure was repeated until the titanium concentration of the mother liquor was lower than 10 mmol/dm³.

The suspension was cooled to room temperature.

The molar ratio Mg:Ti:Cl was: 1:0.12:2.14.

c) Pre-activation of Catalyst Component

Catalyst component as described under b) was pre-activated with triethylaluminium (TEA). For this purpose TEA was added to the suspension corresponding to a molar ratio of TEA/Ti=0.85:1. The preactivation was performed at 60° C. within a time period of 2 hours.

d) Reaction of Catalyst Component with Internal Donor

Suspension of preactivated catalyst component as described under c) was heated to 85° C. Subsequently diethyldiethoxysilane (DEDES) was added corresponding to a molar ratio of DEDES/Ti=0.4. After a post-reaction time of 2 hours the suspension was cooled down to ambient temperature and was washed 5 times with diesel oil. The finished catalyst component was dried in a filtration unit under inert gas blanketing (Ar) after a final washing with heptane. The titanium content of the solid catalyst component was 4.3 wt. % (=1.11 kg catalyst per mol titanium).

e) Ethylene Polymerization in Suspension:

800 cm³ of diesel oil (hydrogenated petroleum fraction having a boiling range from 140 to 170° C.) were placed in a 1.5 dm³ reactor. The reactor was then heated to 85° C. and, under a blanket of nitrogen, 2 mmol of triethylaluminum as cocatalyst and subsequently the catalyst component prepared as described in example 1d in an amount corresponding to 0.045 mmol of titanium, as a suspension diluted with diesel oil, were introduced into the reactor. The reactor was then pressurized with 9.0 bar of hydrogen and 3.0 bar of ethylene. The total pressure of 12 bar was kept constant during the polymerization time of 4 hours by replacing the ethylene which had been consumed. The polymerization was stopped by shutting off the ethylene feed and venting of the gases. The polymer powder was separated off from the dispersion medium by filtration and drying.

The results of the polymerization are shown in Table 1.

Example 2

The catalyst was prepared according to the same procedure described in example 1 except that phenyltriethoxysilane was used as internal donor.

The titanium content of the solid catalyst component was 4.2 wt. % (=1.15 kg catalyst per mol titanium).

The polymerization is carried out as described in Example 1. The results of the polymerization are listed in Table 1.

Example 3

The catalyst was prepared according to the same procedure described in example 1 except that cyclopentyltriethoxysilane was used as internal donor.

The titanium content of the solid catalyst component was 4.3 wt. % (=1.12 kg catalyst per mol titanium).

The polymerization is carried out as described in Example 1. The results of the polymerization are listed in Table 1.

Example 4

The catalyst was prepared according to the same procedure described in example 1 except that isobutyltriethoxysilane was used as internal donor.

The titanium content of the solid catalyst component was 4.7 wt. % (=1.02 kg catalyst per mol titanium).

The polymerization is carried out as described in Example 1. The results of the polymerization are listed in Table 1.

Example 5

The catalyst was prepared according to the same procedure described in example 1 except that diphenyldimethoxysilane was used as internal donor.

The titanium content of the solid catalyst component was 3.9 wt. % (=1.23 kg catalyst per mol titanium).

The polymerization is carried out as described in Example 1. The results of the polymerization are listed in Table 1.

Example 6

The catalyst was prepared according to the same procedure described in example 1 except that cyclohexylmethyldimethoxysilane was used as internal donor.

The titanium content of the solid catalyst component was 3.9 wt. % (=1.24 kg catalyst per mol titanium).

The polymerization is carried out as described in Example 1. The results of the polymerization are listed in Table 1.

Comparative Example 1

The catalyst was prepared according to the same procedure described in example 1 except that no reaction with an internal donor was performed.

The titanium content of the solid catalyst component was 4.4 wt. % (=1.08 kg catalyst per mol titanium).

The polymerization is carried out as described in Example 1. The results of the polymerization are listed in Table 1.

Comparative Example 2

The magnesium chloride and alcohol adduct containing about 3 mols of alcohol was prepared following the method described in example 2 of U.S. Pat. No. 4,399,054, but working at 2000 RPM instead of 10000 RPM.

The so obtained adduct was dealcoholated via a thermal treatment, under nitrogen stream, over a temperature range of 50-150° C. obtaining a precursor having the following composition: 18.5 wt. % Mg, 24.4 wt. %, EtOH and 3.1 wt. % $H_2O$. Mean particle average is 58 μm.

The catalyst was prepared according to the same procedure described in example 1 except that no reaction with an internal donor was performed.

The molar ratio was: Mg:Ti:Cl=1:0.15:2.19. The titanium content of the solid catalyst component was 5.25 wt. % (=0.91 kg catalyst per mol titanium).

The polymerization is carried out as described in Example 1 with exception that 1.33 mmol of triethylaluminum as cocatalyst and 0.0375 mmol of titanium were used and except that the polymerization time was 2 hours. For quantification of catalyst productivity the specific mileage is determined as follows:

Specific mileage=kg polyethylene/(g catalyst/bar ethylene/polymerization-time in hours).

The results of the polymerization are listed in Table 2.

Example 7

Dried catalyst of comparative example 2 was suspended in diesel oil to a concentration of 0.35 g catalyst/cm³ solvent. The suspension was heated to 85° C.

Subsequently phenyltriethoxysilane (PTES) was added as internal donor corresponding to a molar ratio of PTES/Ti=0.5. After a post-reaction time of 2 hours the suspension was cooled down to ambient temperature and was washed 3 times with diesel oil. The finished catalyst component was dried in a filtration unit under inert gas blanketing (Ar) after a final washing with heptane.

The titanium content of the solid catalyst component was 5.05 wt. % (=0.95 kg catalyst per mol titanium).

The polymerization is carried out as described in Example 1 with exception that 1.33 mmol of triethylaluminum as cocatalyst and 0.0375 mmol of titanium were used. The results of the polymerization are listed in Table 2.

Example 8

Dried catalyst of comparative example 2 was suspended in diesel oil to a concentration of 0.10 g catalyst/cm³ solvent. The suspension was heated to 85° C.

Subsequently phenyltriethoxysilane (PTES) was added as internal donor corresponding to a molar ratio of PTES/Ti=0.6. After a post-reaction time of 2 hours the suspension was cooled down to ambient temperature and was washed 3 times with diesel oil.

The titanium content of the solid catalyst component was 5.05 wt. % (=0.95 kg catalyst per mol titanium).

The polymerization is carried out as described in Example 1 with exception that 1.33 mmol of triethylaluminum as cocatalyst and 0.0375 mmol of titanium were used. The results of the polymerization are listed in Table 2.

Example 9

Dried catalyst of comparative example 2 was suspended in diesel oil to a concentration of 0.17 g catalyst/cm³ solvent. The suspension was heated to 85° C.

Subsequently phenyltriethoxysilane (PTES) was added as internal donor corresponding to a molar ratio of PTES/Ti=0.8. After a post-reaction time of 2 hours the suspension was cooled down to ambient temperature and was washed 3 times with diesel oil.

The titanium content of the solid catalyst component was 5.05 wt. % (=0.95 kg catalyst per mol titanium).

The polymerization is carried out as described in Example 1 with exception that 1.33 mmol of triethylaluminum as cocatalyst and 0.0375 mmol of titanium were used. The results of the polymerization are listed in Table 2.

Example 10

Dried catalyst of comparative example 2 was suspended in diesel oil to a concentration of 0.11 g catalyst/cm³ solvent. The suspension was heated to 85° C.

Subsequently isobutyltriethoxysilane (iBuTES) was added as internal donor corresponding to a molar ratio of iBuTES/Ti=0.2. After a post-reaction time of 5 hours the suspension was cooled down to ambient temperature and was washed 5 times with diesel oil. The finished catalyst component was dried in a filtration unit under inert gas blanketing (Ar) after a final washing with heptane.

The titanium content of the solid catalyst component was 5.25 wt. % (=0.91 kg catalyst per mol titanium).

The polymerization is carried out as described in Example 1 with exception that 1.33 mmol of triethylaluminum as cocatalyst and 0.0375 mmol of titanium were used and except that the polymerization time was 3 hours. The results of the polymerization are listed in Table 2.

Example 11

Dried catalyst of comparative example 2 was suspended in diesel oil to a concentration of 0.08 g catalyst/cm³ solvent. The suspension was heated to 85° C.

Subsequently isobutyltriethoxysilane (iBuTES) was added as internal donor corresponding to a molar ratio of iBuTES/Ti=0.4. After a post-reaction time of 5 hours the suspension was cooled down to ambient temperature and was washed 5 times with diesel oil. The finished catalyst component was dried in a filtration unit under inert gas blanketing (Ar) after a final washing with heptane.

The titanium content of the solid catalyst component was 5.25 wt. % (=0.91 kg catalyst per mol titanium).

The polymerization is carried out as described in Example 1 with exception that 1.33 mmol of triethylaluminum as cocatalyst and 0.0375 mmol of titanium were used and except that the polymerization time was 3 hours. The results of the polymerization are listed in Table 2.

Comparative Example 3

The magnesium chloride and alcohol adduct containing about 3 mols of alcohol was prepared following the method described in example 2 of U.S. Pat. No. 4,399,054, but working at 2000 RPM instead of 10000 RPM.

The so obtained adduct was dealcoholated via a thermal treatment, under nitrogen stream, over a temperature range of 50-150° C. obtaining a precursor having the following composition: 18.9 wt. % Mg, 24.2 wt. % EtOH and 1.9 wt. % $H_2O$. Mean particle average is 58 μm.

The catalyst was prepared according to the same procedure described in example 1 except that no reaction with an internal donor was performed.

The molar ratio was: Mg:Ti:Cl=1:0.12:2.17. The titanium content of the solid catalyst component was 4.75 wt. % (=1.01 kg catalyst per mol titanium).

The polymerization is carried out as described in Example 1 with exception that 1.33 mmol of triethylaluminum as cocatalyst and 0.0375 mmol of titanium were used and except that polymerization temperature and polymerization time were 75° C. and 2 hours, respectively. For quantification of catalyst productivity the specific mileage is determined as follows:

Specific mileage=kg polyethylene/(g catalyst/bar ethylene/polymerization-time in hours).

The results of the polymerization are listed in Table 3.

Example 12

Dried catalyst of comparative example 3 was suspended in diesel oil to a concentration of 0.08 g catalyst/cm³ solvent. The suspension was heated to 85° C.

Subsequently diphenyldimethoxysilane (DPDMS) was added as internal donor corresponding to a molar ratio of DPDMS/Ti=0.2. After a post-reaction time of 5 hours the suspension was cooled down to ambient temperature and was washed 5 times with diesel oil.

The titanium content of the solid catalyst component was 4.75 wt. % (=1.01 kg catalyst per mol titanium).

The polymerization is carried out as described in Example 1 with exception that 1.33 mmol of triethylaluminum as cocatalyst and 0.0375 mmol of titanium were used and except that polymerization temperature and polymerization time were 75° C. and 2 hours, respectively. The results of the polymerization are listed in Table 3.

Example 13

Dried catalyst of comparative example 3 was suspended in diesel oil to a concentration of 0.096 g catalyst/cm³ solvent. The suspension was heated to 85° C.

Subsequently diphenyldimethoxysilane (DPDMS) was added as internal donor corresponding to a molar ratio of DPDMS/Ti=0.4. After a post-reaction time of 5 hours the suspension was cooled down to ambient temperature and was washed 5 times with diesel oil.

The titanium content of the solid catalyst component was 4.75 wt. % (=1.01 kg catalyst per mol titanium).

The polymerization is carried out as described in Example 1 with exception that 1.33 mmol of triethylaluminum as cocatalyst and 0.0375 mmol of titanium were used and except that polymerization temperature and polymerization time were 75° C. and 2 hours, respectively. The results of the polymerization are listed in Table 3.

Example 14

Dried catalyst of comparative example 3 was suspended in diesel oil to a concentration of 0.09 g catalyst/cm³ solvent. The suspension was heated to 85° C.

Subsequently isobutyltriethoxysilane (iBuTES) was added as internal donor corresponding to a molar ratio of iBuTES/Ti=0.4. After a post-reaction time of 5 hours the suspension was cooled down to ambient temperature and was washed 5 times with diesel oil. The finished catalyst component was dried in a filtration unit under inert gas blanketing (Ar) after a final washing with heptane.

The titanium content of the solid catalyst component was 4.7 wt. % (=1.02 kg catalyst per mol titanium).

The polymerization is carried out as described in Example 1 with exception that 1.33 mmol of triethylaluminum as cocatalyst and 0.0375 mmol of titanium were used and except that polymerization temperature was 75° C. The results of the polymerization are listed in Table 3.

Example 15

Dried catalyst of comparative example 3 was suspended in diesel oil to a concentration of 0.08 g catalyst/cm³ solvent. The suspension was heated to 85° C.

Subsequently phenyltriethoxysilane (PTES) was added as internal donor corresponding to a molar ratio of PTES/Ti=0.4. After a post-reaction time of 5 hours the suspension was cooled down to ambient temperature and was washed 5 times with diesel oil. The finished catalyst component was dried in a filtration unit under inert gas blanketing (Ar) after a final washing with heptane.

The titanium content of the solid catalyst component was 4.7 wt. % (=1.02 kg catalyst per mol titanium).

The polymerization is carried out as described in Example 1 with exception that 1.33 mmol of triethylaluminum as cocatalyst and 0.0375 mmol of titanium were used and except that polymerization temperature was 75° C. The results of the polymerization are listed in Table 3.

Example 16

Dried catalyst of comparative example 3 was suspended in diesel oil to a concentration of 0.09 g catalyst/cm³ solvent. The suspension was heated to 85° C.

Subsequently diethyldiethoxysilane (DEDES) was added as internal donor corresponding to a molar ratio of DEDES/Ti=0.4. After a post-reaction time of 5 hours the suspension was cooled down to ambient temperature and was washed 5 times with diesel oil. The finished catalyst component was dried in a filtration unit under inert gas blanketing (Ar) after a final washing with heptane.

The titanium content of the solid catalyst component was 4.7 wt. % (=1.02 kg catalyst per mol titanium).

The polymerization is carried out as described in Example 1 with exception that 1.33 mmol of triethylaluminum as cocatalyst and 0.0375 mmol of titanium were used and except that polymerization temperature was 75° C. The results of the polymerization are listed in Table 3.

TABLE 1

Polymerization experiments in 1.5 dm³ reactor, 2 mmol of triethylaluminum, 0.8 dm³ of diesel oil, polymerization temperature: 85° C., 9.0 bar of $H_2$, 3.0 bar of ethylene ($C_2$) (total pressure: 12 bar), polymerization time: 4 h

| Ex. | Mileage kg/gcatalyst | $MFR_{2.16}$ g/10 min | BD g/dm³ | d50 μm | Fraction smaller than 300 μm wt. % | s-value |
|---|---|---|---|---|---|---|
| 1 | 2.3 | 162 | 345 | 732 | 1.4 | 0.26 |
| 2 | 2.5 | 141 | 344 | 727 | 3.3 | 0.28 |
| 3 | 2.5 | 155 | 332 | 710 | 2.7 | 0.26 |
| 4 | 2.8 | 158 | 351 | 716 | 2.5 | 0.27 |
| 5 | 2.0 | 161 | 338 | 720 | 3.9 | 0.30 |
| 6 | 1.3 | 168 | 337 | 685 | 3.4 | 0.30 |
| C1 | 3.3 | 125 | 289 | 643 | 5.1 | 0.28 |

TABLE 2

Polymerization experiments in 1.5 dm³ reactor, 1.33 mmol of triethylaluminum, 0.8 dm³ of diesel oil, polymerization temperature: 85° C., 9.0 bar of H$_2$, 3.0 bar of ethylene (C$_2$) (total pressure: 12 bar)

| Ex. | Specific Mileage kgPE/ (gcatalyst/bar$_{C2}$/h) | MFR$_{2.16}$ g/10 min | BD g/dm³ | d50 μm | <300 μm wt. % | s-value |
|---|---|---|---|---|---|---|
| 7  | 0.42 | 114 | 300 | 953 | 1.3 | 0.26 |
| 8  | 0.44 | 122 | 311 | 991 | 0.9 | 0.26 |
| 9  | 0.24 | 114 | 315 | 720 | 4.2 | 0.38 |
| 10 | 0.30 | 189 | 339 | 959 | 0.5 | 0.22 |
| 11 | 0.32 | 167 | 313 | 981 | 0.6 | 0.26 |
| C2 | 0.50 | 177 | 240 | 717 | 3.0 | 0.31 |

TABLE 3

Polymerization experiments in 1.5 dm³ reactor, 1.33 mmol of triethylaluminum, 0.8 dm³ of diesel oil, polymerization temperature: 75° C., 9.0 bar of H$_2$, 3.0 bar of ethylene (C$_2$) (total pressure: 12 bar)

| Ex. | Specific Mileage kgPE/ (gcatalyst/bar$_{C2}$/h) | MFR$_{2.16}$ g/10 min | BD g/dm³ | d50 μm | Fraction Smaller than 300 μm wt. % | s-value |
|---|---|---|---|---|---|---|
| 12 | 0.50 | 86 | 290 | 914 | 1.0 | 0.29 |
| 13 | 0.37 | 73 | 293 | 881 | 0.9 | 0.31 |
| 14 | 0.38 | 40 | 295 | 934 | 2.4 | 0.30 |
| 15 | 0.26 | 53 | 321 | 970 | 0.8 | 0.28 |
| 16 | 0.30 | 72 | 317 | 988 | 0.9 | 0.28 |
| C3 | 0.76 | 62 | 244 | 614 | 9.7 | 0.37 |

The invention claimed is:

1. A process for producing a catalyst component for the polymerization of olefins comprising Mg, Ti and Cl obtained by a process comprising the following steps:
   (a) reacting a precursor of formula MgCl$_2$·mEtOH, wherein m is at most 1.5 having a porosity due to pores with radius up to 1μ of higher than 0.4 cm³/g with an alcohol of formula R$^4$OH where R$^4$ is an alkyl different from ethyl, a cycloalkyl or aryl radical having 3-20 carbon atoms, said R$^4$OH being reacted with the said precursor using molar ratio R$^4$OH/Mg ranging from 0.01 to 10;
   (b) reacting the product obtained in (a) with TiCl$_4$ using a Ti/Mg molar ratio ranging from 0.01 to 15; and
   (c) reacting the product obtained in (b) with an internal donor, wherein the internal donor is a silicon compound of formula R$^I_a$R$^{II}_b$Si(OR$^{III}$)$_{4-(a+b)}$ wherein R$^I$-R$^{III}$ are C1-C20 hydrocarbon, and groups a and b are integers from 0 to 2, wherein the internal donor is present in a molar ratio of 0.05 to 3 with respect to the molar amount of Ti present in the product obtained in (b).

2. The process of claim 1, wherein the molar ratio R$^4$OH/Mg in step (a) ranges from 0.05 to 4.

3. The process of claim 1, wherein R$^4$ is selected from C3-C12 secondary alkyls.

4. The process of claim 2, wherein R$^4$ is selected from C3-C8 cycloalkyls.

5. The process of claim 1, wherein the precursor of formula MgCl$_2$·mEtOH has porosity due to pores with radius up to 1 μm of higher than 0.5 cm³/g.

6. The process of claim 5, wherein, in the precursor, m is lower than 1.

7. The process of claim 6, wherein the precursor is obtained by chemical dealcoholation of adducts of formula MgCl$_2$·mEtOH wherein m ranges from 1.5 to 4.5.

8. The process of claim 1, wherein in step (b) the TiCl$_4$ is used in amounts such that a Ti/Mg molar ratio ranges from 0.1 to 10.

9. The process of claim 1, wherein the reaction product of step (b) is subject to a pre-activation treatment with hydrocarbylaluminum having from 1 to 8 carbon atoms in the hydrocarbyl radical.

10. The process of claim 1, wherein the silicon compound R$^{III}$ is a linear C1-C5 alkyl.

11. The process of claim 1, wherein the silicon compound a+b is 1 or 2 and R$^{III}$ is ethyl.

12. The process of claim 1, wherein the silicon compound b is 0, a is 1 and R$^I$ is a linear or branched alkyl radical having from 3 to 10 carbon atoms.

13. The process of claim 1, wherein the silicon compound a and b are 1, R$^I$ and R$^{II}$ are selected from C1-C10 alkyl, cycloalkyl or aryl groups and R$^{III}$ is a linear C1-C5 alkyl.

14. The process of claim 1, wherein the product obtained in step (c) is reacted with an organo-Al compound.

15. The process of claim 1, wherein the olefin has the formula: CH$_2$=CHR$^{III}$, wherein R$^{III}$ is hydrogen or a hydrocarbon radical having 1-12 carbon atoms, carried out in the presence of the catalyst of claim 14.

16. The process of claim 10, wherein the linear C1-C5 alkyl is methyl or ethyl.

* * * * *